(12) United States Patent
Hochstetter et al.

(10) Patent No.: US 10,301,462 B2
(45) Date of Patent: May 28, 2019

(54) POLYVINYLIDENE FLUORIDE COMPOSITION

(71) Applicant: Arkema France, Colombes (FR)

(72) Inventors: Gilles Hochstetter, Bernay (FR); Lionel Hugon, Menneval (FR); Thomas Labour, Evreux (FR); Thierry Lannuzel, Villeurbanne (FR); Barbara Wiegert, Barc (FR); Ramin Amin-Sanayei, Malvern, PA (US)

(73) Assignee: Arkema France, Colombes (FR)

( * ) Notice: Subject to any disclaimer, the term of this patent is extended or adjusted under 35 U.S.C. 154(b) by 894 days.

(21) Appl. No.: 14/380,977

(22) PCT Filed: Mar. 1, 2013

(86) PCT No.: PCT/FR2013/050436
§ 371 (c)(1),
(2) Date: Aug. 26, 2014

(87) PCT Pub. No.: WO2013/128142
PCT Pub. Date: Sep. 6, 2013

(65) Prior Publication Data
US 2016/0017136 A1     Jan. 21, 2016

(30) Foreign Application Priority Data

Mar. 1, 2012 (FR) .................................... 12 51913

(51) Int. Cl.
| C08L 27/16 | (2006.01) |
| F16L 9/12 | (2006.01) |
| F16L 11/04 | (2006.01) |
| H01M 4/62 | (2006.01) |
| C08K 5/00 | (2006.01) |
| C08K 5/11 | (2006.01) |

(52) U.S. Cl.
CPC ............ *C08L 27/16* (2013.01); *C08K 5/0016* (2013.01); *C08K 5/11* (2013.01); *F16L 9/12* (2013.01); *F16L 11/04* (2013.01); *H01M 4/623* (2013.01); *C08L 2205/02* (2013.01)

(58) Field of Classification Search
CPC . C08L 27/16; F16L 9/12; F16L 11/04; H01M 4/623; C08K 5/0016; C08K 5/11
See application file for complete search history.

(56) References Cited

U.S. PATENT DOCUMENTS

| 4,200,568 | A | 4/1980 | Trautvetter et al. |
| 5,429,849 | A | 7/1995 | Lasson et al. |
| 6,271,294 | B1 | 8/2001 | Lasson et al. |
| 6,770,372 | B2 | 8/2004 | Lasson et al. |
| 8,426,509 | B2 | 4/2013 | Abusleme et al. |
| 8,609,756 | B2 | 12/2013 | Baert et al. |
| 8,627,713 | B2 | 1/2014 | Hochstetter et al. |
| 2004/0054050 | A1 | 3/2004 | Pascal et al. |
| 2004/0127766 | A1 | 7/2004 | Chen |
| 2005/0027076 | A1 | 2/2005 | Mizuno et al. |
| 2008/0207819 | A1 | 8/2008 | Pascal et al. |
| 2009/0124748 | A1* | 5/2009 | Baert .................. C08L 27/06 524/502 |

FOREIGN PATENT DOCUMENTS

WO    WO 96/26980    9/1996

* cited by examiner

*Primary Examiner* — John E Uselding
(74) *Attorney, Agent, or Firm* — Thomas Roland; Joanne Rossi

(57) ABSTRACT

The invention relates to a composition comprising: a homopolymer polyvinylidene fluoride; a copolymer of vinylidene fluoride and of at least one other fluorinated comonomer copolymerizable with vinylidene fluoride (VDF), the weight proportion of the copolymer in the composition being between 10 to 35%; and a plasticizer, the weight proportion of the plasticizer in the composition being between 1 and 5%. The invention also relates to a method for producing the composition and the use thereof for producing various items.

17 Claims, No Drawings ns # POLYVINYLIDENE FLUORIDE COMPOSITION

CLAIM TO PRIORITY

This application claims benefit, under U.S.C. § 119 or § 365 of PCT Application Number PCT/FR2013/050436, filed Mar. 1, 2013, and French Patent Application Number FR 1251913, filed Mar. 1, 2012.

FIELD OF THE INVENTION

The present invention relates to a fluoropolymer composition, to processes for the manufacture of the latter and to products which can be manufactured from this composition.

TECHNICAL BACKGROUND

The transportation of chemicals in the liquid or gas state in pipes presents numerous advantages: it is more economic, once the infrastructure has been put in place; it makes possible the transportation of large volumes; it provides great safety of supply, by virtue of a uniform flow rate; finally, it is a safer means than rail or road.

It is known to use, for the transportation of liquid or gas products, metal pipes or pipes made of plastics, or also metal pipes coated with one or more polymer layers. According to the fluid to be transported, these pipes have to meet multiple requirements, in particular as regards the properties of mechanical strength (in particular impact strength), of elasticity, of creep strength, of fatigue strength, of resistance to swelling, of chemical resistance (resistance to corrosion, to oxidation, to ozone, to chlorinated products, and the like) and of thermal resistance.

For example, pipes are known which comprise one or more metal components which guarantee the mechanical stiffness but which are not leaktight to the fluids transported (for example components made of steel or of cast iron), and also various layers based on polymeric compositions, in order to provide leaktightness to the fluids transported and also thermal insulation. Typically, in the case of the polymeric layers, the thickness/diameter ratio is of the order of 1/10. These polymeric compositions can be polyethylene-based but this limits the temperature of use of the pipes to a maximum of 60° C. They can also be based on fluoropolymers, such as polyvinylidene fluoride (PVDF), suitable for higher temperatures of use, up to 130° C., and exhibiting good chemical resistance and good thermal behavior. However, PVDF is very rigid and, for this reason, PVDF homopolymers are often formulated or used as a blend with copolymers based on vinylidene fluoride (VDF) and optionally plasticizer, in order to reduce the stiffness thereof.

The document BE 832851 describes fluoroelastomers comprising a molar proportion of 50 to 85% of VDF and of 15 to 25% of hexafluoropropylene (HFP), i.e. a proportion by weight of 47 to 71% of VDF and of 29 to 53% of HFP, which are used for the manufacture of molded PVDF bodies comprising from 1 to 30% by weight of fluoroelastomer. However, such compositions have a limited extrudability and do not make possible the manufacture of pipes having a thickness/diameter ratio of approximately 1/10. Furthermore, such compositions exhibit an insufficient fatigue strength for the applications described above.

The document EP 1 342 752 describes PVDF-based compositions comprising: (A) a PVDF homopolymer or a VDF-based copolymer; (B) a fluoroelastomer; (C) optionally a plasticizer. The fluoroelastomer (B) is present at a content of from 0.5 to 10 parts by weight per 100 parts of homopolymer or copolymer (A) and from 0 to 10 parts by weight of a plasticizer (C), with the additional condition that the sum of (B) plus (C) is from 0.5 to 10.5 parts by weight. These compositions correspond to the following proportions by weight: 89.5 to 90.5% of a PVDF homopolymer or a VDF-based copolymer (A); 0.5 to 9% of a fluoroelastomer (B); 0 to 9% of a plasticizer (C). Disclosed among the examples are compositions comprising from 2 to 4% of VDF/HFP copolymer as fluoroelastomer. The HFP content in the copolymer is from 30 to 40%.

The document EP 0 608 639 describes polymeric compositions comprising, by weight, from 60 to 80% of PVDF, from 20 to 40% of a thermoplastic copolymer of VDF and of another fluorinated comonomer (present at a content of 5 to 25% in the copolymer) and from 5 to 20% of a plasticizer (with respect to the sum of the PVDF and copolymer). The thermoplastic copolymers envisaged include VDF/HFP copolymers. The HFP contents indicated in the copolymers which are disclosed in the examples are of the order of 10%.

The document EP 0 608 940 describes polymeric compositions comprising, by weight, from 25 to 75% of PVDF and from 25 to 75% of thermoplastic copolymer of VDF and of another fluorinated comonomer (present at a content of 5 to 25% in the copolymer). The thermoplastic copolymers envisaged include VDF/HFP copolymers.

The document WO 2006/045753 describes polymeric compositions based on PVDF and on a thermoplastic fluorinated copolymer. A plasticizer can added at a content of at most 5%. The proportion of thermoplastic fluorinated copolymer is, for example, from 20 to 55%, with respect to the sum of the latter and of PVDF. The thermoplastic fluorinated copolymer can, for example, be a copolymer of VDF and of another fluorinated comonomer, which can be present in a content of 5 to 25%. HFP is mentioned as possible fluorinated comonomer.

The document WO 2007/006645 describes compositions comprising a thermoplastic fluoropolymer (which can, for example, be a blend of VDF homopolymer and of copolymer of VDF and of a fluorinated comonomer present at a content of 0.1 to 15 mol % in the copolymer), a (per)fluoropolyether and a per(halo)fluoropolymer.

However, the polymeric compositions provided in the state of the art are not completely satisfactory. In particular, the fatigue strength of some polymeric compositions of the state of the art is regarded as insufficient for the applications targeted and very particularly for the manufacture of pipes for the transportation of liquid or gas synthetic products (for example for the transportation of hydrogen).

There thus exists a real need to develop an alternative polymeric composition exhibiting improved properties, in particular an improved fatigue strength, in order to manufacture pipes which remain mechanically reliable over the long term.

SUMMARY OF THE INVENTION

The invention relates, first, to a composition comprising:
a polyvinylidene fluoride homopolymer;
a copolymer of vinylidene fluoride and of at least one other fluorinated comonomer which is copolymerizable with VDF, the copolymer being present in the composition in a proportion by weight of 10 to 35%;
a plasticizer;
the proportion by weight of comonomer(s) other than the vinylidene fluoride in the copolymer being greater than 25%.

According to one embodiment, the plasticizer is chosen from dibutyl sebacate, dioctyl phthalate, N-(n-butyl)sulfonamide, polymeric polyesters and the combinations of these, and is preferably dibutyl sebacate.

According to one embodiment, the plasticizer is present in the composition in a proportion by weight of 1 to 5%, preferably of 2 to 3.5%.

According to one embodiment, the copolymer is present in the composition in a proportion by weight of 20 to 35%, preferably of 25 to 35%.

According to one embodiment, the proportion by weight of (co)monomer(s) other than vinylidene fluoride in the copolymer is greater than or equal to 26% and/or less than or equal to 40%, preferably less than or equal to 37%.

According to one embodiment, the fluorinated comonomer is chosen from vinylfluoride, trifluoroethylene, chlorotrifluoroethylene (CTFE), 1,2-difluoroethylene, tetrafluoroethylene (TFE), hexafluoropropylene (HFP), perfluoro(alkyl vinyl) ethers, such as perfluoro(methyl vinyl) ether (PMVE), perfluoro(ethyl vinyl) ether (PEVE) or perfluoro(propyl vinyl) ether (PPVE), perfluoro(1,3-dioxozole), perfluoro(2,2-dimethyl-1,3-dioxozole) (PDD), the product of formula $CF_2=CFOCF_2CF(CF_3)OCF_2CF_2X$ in which X is $SO_2F$, $CO_2H$, $CH_2OH$, $CH_2OCN$ or $CH_2OPO_3H$, the product of formula $CF_2=CFOCF_2CF_2SO_2F$, the product of formula $F(CF_2)_nCH_2OCF=CF_2$ in which n is 1, 2, 3, 4 or 5, the product of formula $R1CH_2OCF=CF_2$ in which R1 is hydrogen or $F(CF_2)_z$ and z has the value 1, 2, 3 or 4, the product of formula $R3OCF=CH_2$ in which R3 is $F(CF_2)_z$ and z has the value 1, 2, 3 or 4, or also perfluorobutylethylene (PFBE), fluoroethylene/propylene (FEP), 3,3,3-trifluoropropene, 2-trifluoromethyl-3,3,3-trifluoro-1-propene, 2,3,3,3-tetrafluoropropene or HFO-1234yf, E-1,3,3,3-tetrafluoropropene or HFO-1234zeE, Z-1,3,3,3-tetrafluoropropene or HFO-1234zeZ, 1,1,2,3-tetrafluoropropene or HFO-1234yc, 1,2,3,3-tetrafluoropropene or HFO-1234ye, 1,1,3,3-tetrafluoropropene or HFO-1234zc and chlorotetrafluoropropene or HCFO-1224.

According to a preferred embodiment, the comonomer is hexafluoropropylene.

According to one embodiment, the copolymer is a terpolymer.

According to one embodiment, the copolymer is an elastomer.

According to one embodiment, the above composition exhibits a fatigue strength in the nonaged state of greater than or equal to 50 000 cycles, preferably of greater than or equal to 75 000 cycles, more preferably still of greater than or equal to 100 000 cycles, on average, and/or a fatigue strength in the state aged for one month at 150° C. in air of greater than or equal to 5000 cycles, preferably of greater than or equal to 8000 cycles, on average.

According to one embodiment, the above composition consists of the polyvinylidene fluoride homopolymer, the copolymer of vinylidene fluoride and of at least one other fluorinated comonomer which is copolymerizable with VDF, and the plasticizer.

According to a preferred embodiment, which will be described in more detail below, the composition consists of the polyvinylidene fluoride homopolymer, the VDF/HFP copolymer and the plasticizer.

Another subject matter of the invention is a process for the manufacture of the above composition, comprising the blending of the homopolymer, the copolymer and the plasticizer. This manufacturing process comprises any method which makes it possible to obtain a homogeneous blend of the different constituents. Mention may in particular be made, among these methods, of melt or dry blending.

More particularly, the composition according to the invention is prepared by melt blending all the constituents on a compounding device, such as a twin-screw extruder, a co-kneader, an internal mixer or a roll mill.

According to one embodiment, the homopolymer and the copolymer are in the dry form during the blending, preferably in the form of powders, and the blending with the plasticizer is preferably carried out in the molten state on a compounding device, such as a twin-screw extruder, a co-kneader, an internal mixer or a roll mill.

According to one embodiment, the above process comprises the blending of the homopolymer and the copolymer in the latex form and the drying of the blend of homopolymer and copolymer, and the combining of the dried blend with the plasticizer is carried out in the molten state on a compounding device, such as a twin-screw extruder, a co-kneader, an internal mixer or a roll mill.

The composition according to the invention obtained by the manufacturing process described above can subsequently be transformed for use in the form of pipes or cables, in particular using devices such as an extruder provided with a suitable die, or else for use as binders for conductive particles.

Another subject matter of the invention is a pipe for the terrestrial transportation of products in the gas state which is manufactured from the abovementioned composition.

According to one embodiment, the abovementioned pipe is for the transportation of synthetic products, in particular for the transportation of hydrogen, oxygen, steam, carbon monoxide, ammonia, hydrogen fluoride, hydrochloric acid, hydrogen sulfide, any gas resulting from the cracking of hydrocarbons, or mixtures of these.

Another subject matter of the invention is a pipe for the terrestrial transportation of products in the liquid state which is manufactured from the abovementioned composition.

According to one embodiment, the abovementioned pipe is for the transportation of water, solvents or mixtures of these.

According to one embodiment, the abovementioned pipe is an underground pipe for a service station or a fuel feed pipe for vehicles.

Another subject matter of the invention is an electric cable manufactured from the abovementioned composition.

Another subject matter of the invention is a binder for conductive particles for a rechargeable battery, manufactured from the abovementioned composition.

Another subject matter of the invention is the use of the composition described above in the manufacture of abovementioned pipes, electric cables or binders for conductive particles.

The present invention makes it possible to overcome the disadvantages of the state of the art. It more particularly provides a novel polymeric composition exhibiting improved properties, in particular an improved fatigue strength. This composition thus makes it possible to manufacture pipes which remain mechanically reliable over the long term. The composition according to the invention is particularly appropriate in the manufacture of pipes for the transportation of liquid or gaseous synthetic products (for example for the transportation of hydrogen).

This is accomplished by combining, with a PVDF homopolymer, a copolymer of VDF and of at least one other fluorinated comonomer which is copolymerizable with VDF, such as HFP, exhibiting a high content of fluorinated comonomer and consequently exhibiting elastomeric properties, the copolymer being present in the final composition in a proportion of 10 to 35%, and by adding a plasticizer to the composition.

DESCRIPTION OF EMBODIMENTS OF THE INVENTION

The invention is now described in more detail and without implied limitation in the description which follows.

The vinylidene fluoride homopolymer used in the context of the invention preferably exhibits a melt flow index of less than or equal to 15 g/10 min, advantageously of less than or equal to 10 g/10 min and ideally of less than or equal to 5 g/10 min, according to the standard ISO 1133 (230° C., 12.5 kg), in order to guarantee good mechanical strength properties.

The copolymer of VDF and of at least one other fluorinated (co)monomer which is copolymerizable with VDF used in the context of the invention is preferably an elastomer, which is defined by the ASTM in Special Technical Publication No. 184 as being a material which can be drawn at ambient temperature to twice its initial length and which, once released, rapidly resumes its initial length, to within about 10%.

This copolymer is obtained by copolymerization of monomers of VDF and of at least one other fluorinated (co) monomer. It has been found that copolymers of VDF and of another fluorinated (co)monomer are thermoplastics are at low contents of fluorinated comonomer and are elastomers at high contents of fluorinated comonomer.

In the context of the invention, the content or proportion by weight of fluorinated (co)monomers is greater than 25%.

According to some embodiments, this proportion by weight of fluorinated (co)monomer is greater than or equal to 26%, or 27%, or 28%, or 29%, or 30%, or 31%, or 32%, or 33%, or 34%, or 35%, or 36%, or 37%, or 38%, or 39%.

According to some embodiments, this proportion by weight of fluorinated (co)monomer is less than or equal to 40%, or 39%, or 38%, or 37%, or 36%, or 35%, or 34%, or 33%, or 32%, or 31%, or 30%, or 29%, or 28%, or 27%, or 26%.

The proportion by weight of fluorinated comonomer in the copolymer is preferably determined by nuclear magnetic resonance.

Use may in particular be made of the following $^{19}$F NMR method, developed for a VDF/HFP copolymer.

The copolymer samples are dissolved in an NMR tube with a diameter of 5 mm. The samples of copolymer comprising more than 10% by weight of HFP are dissolved in $d_6$-acetone at 55° C. An amount of copolymer (approximately 10 mg) is placed in a tube and solvent is added to fill 5.5 cm of tube (approximately 0.75 ml of solvent). A heating plate is used to bring the samples to the desired temperature. The samples are heated for at least one hour until the solid has dissolved and the gel has disappeared. The tubes are inverted in order to confirm the absence of gel.

The spectra are acquired on a spectrometer of Bruker DMX or Varian Mercury 300 type operated at 55° C. in the case of the $d_6$-acetone solvent and are analyzed according to the method described in "Composition and sequence distribution of vinylidene fluoride copolymer and terpolymer fluoroelastomers. Determination by $^{19}$F NMR spectroscopy and correlation with some properties", M. Pianca et al., *Polymer*, 1987, vol. 28, 224-230. The accuracy of the measurements is confirmed by measuring of the integrals of $CF_3$ and of CF and by comparing them in order to see if they are indeed in a ratio of 3 to 1.

Preferably, the copolymer used in the preparation of the composition according to the invention is essentially devoid of homopolymer.

The copolymer can be manufactured by the process described in the abovementioned publication of M. Pianca et al.

The copolymer is chosen so as to have a viscosity which makes it possible for the blend with the vinylidene fluoride homopolymer and the plasticizer, forming the composition according to the invention, to exhibit a nodular morphology which is sufficiently stable in the transformation by extrusion.

The plasticizers within the meaning of the invention are the compounds defined in the work *Encyclopedia of Polymer Science and Engineering*, published by Wiley & Sons (1989), pp. 568-569 and pp. 588-593. They can be monomeric or polymeric. Mention may in particular be made of dibutyl sebacate, dioctyl phthalate, N-(n-butyl)sulfonamide, polymeric polyesters and the combinations of these. The appropriate polymeric polyesters are in particular those derived from adipic, azelaic or sebacic acid and diols, and the combinations of these, the molecular weight preferably being greater than or equal to 1500, more particularly greater than or equal to 1800, and preferably less than or equal to 5000 and more particularly less than or equal to 2500. Plasticizers with an excessive molecular weight would result in a composition exhibiting an excessively weak impact strength.

Dibutyl sebacate constitutes a particularly advantageous plasticizer.

The presence of the plasticizer facilitates the manufacture of the composition according to the invention or its transformation in order to manufacture various products or objects. It also improves the impact strength of the composition according to the invention.

In addition to the PVDF, copolymer and plasticizer, the composition according to the invention can comprise various additives and/or fillers and/or electrically conductive particles and/or inorganic or organic pigments or dyes.

Mention may be made, among the possible fillers, without implied limitation, of mica, alumina, talc, carbon black, glass fibers, macromolecular compounds and calcium carbonate.

Mention may be made, among the possible fillers, without implied limitation, of UV stabilizers (preferably with the exception of the agents of Irganox® type), flame-retardant products, heat stabilizers or manufacturing adjuvants (preferably with the exception of polyolefins and in particular ethylene-based polymers).

When they are present, the above compounds, distinct from the PVDF, the copolymer and the plasticizer, are present at a content of at most 20%, preferably of at most 15%, or of at most 10%, or of at most 7%, or of at most 5%, or of at most 3%, or of at most 2%, or of at most 1% (as proportion by weight with respect to the total composition).

According to another embodiment, a composition according to the invention is essentially composed of PVDF, copolymer and plasticizer, indeed even consists of PVDF, copolymer and plasticizer.

Another subject matter of the invention is a process for the manufacture of the above composition, comprising the blend of the homopolymer, of the copolymer and of the plasticizer. This manufacturing process comprises any method which makes it possible to obtain a homogeneous blend of the various constituents. Mention may in particular be made, among these methods, of melt or dry blending. More particularly, the composition according to the invention is prepared by melt blending all the constituents on a compounding device, such as a twin-screw extruder, a co-kneader, an internal mixer or a roll mill.

According to one embodiment, the homopolymer and the copolymer are in the dry form during the blending, preferably in the form of powders.

According to one embodiment, the above process comprises the preblending of the homopolymer and the copolymer in the latex (or emulsion) form and then drying the preblend to give a powder. An alternative form consists in preblending the PVDF in the latex form with the copolymer in the powder form (or the reverse) and in then drying this type of preblend to give a powder.

The plasticizer and the optional additives can be incorporated in the compositions during the blending of the PVDF and of the copolymer, or also blended with one or other of these constituents prior to their blending, or also during the preblending of the PVDF and of the copolymer, according to the preblending techniques stated above.

The content by weight of copolymer in the composition is from 10 to 35%, in particular from 20 to 35% and preferably from 25 to 35%.

According to certain embodiments, the content by weight of copolymer in the composition is greater than or equal to 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%.

According to certain embodiments, the content by weight of copolymer in the composition is less than or equal to 34%, or 33%, or 32%, or 31%, or 30%, or 29%, or 28%, or 27%, or 26%, or 25%, or 24%, or 23%, or 22%, or 21%, or 20%, or 19%, or 18%, or 17%, or 16%, or 15%, or 14%, or 13%, or 12%, or 11%.

The content by weight of plasticizer in the final composition is preferably from 1 to 5%, in particular from 2 to 3.5%. An excessive amount of plasticizer results in an undesirable variation in volume of the composition according to the invention, by exudation of the plasticizer.

The composition according to the invention makes it possible to manufacture all types of pipes for the transportation of gas or liquid products, in particular intended to transport gas products for the synthesis of chemicals or intended to transport individual, industrial or public consumer goods, with the exception of umbilicals and hoses used onshore and offshore to contain and/or transport crude oil, natural gas, water and other gases used for drilling, as defined in the standards API 17J, API 16C and API 15RS.

The composition according to the invention also makes it possible to manufacture, alone or in combination with other products, cables, hollow bodies or binders for rechargeable batteries.

The composition according to the invention is tested by means of the fatigue test, which is described in the document WO 2010/026356. It consists in determining, for a given sample of polymeric composition, the number of cycles to failure (denoted NCF), that is to say the number of cycles at the end of which failure of the sample occurs. The higher the NCF, the better the result of the fatigue test.

In order to carry out a fatigue test, axisymmetric test specimens are cut out from the thickness of an extruded pipe or an extruded strip, with a notch radius of curvature of 4 mm and a minimum radius of 2 mm. These test specimens are regarded as being representative of the local geometry of a pipe used in the applications targeted. The test is carried out by means of a servo-hydraulic testing machine, for example of MTS 810 type. The distance between the jaws is 10 mm. A maximum elongation of 1.4 mm and a ratio of the minimum elongation to the maximum elongation of 0.21, which corresponds to a minimum elongation of 0.3 mm, with a sinusoidal signal having a frequency of 1 Hz at a temperature of −10° C., is applied to the test specimen. The result of the test (NCF) is the mean of the results obtained on 10 test specimens.

The process for evaluating the fatigue strength of the polymeric compositions thus comprises the following stages:
i) providing a polymeric composition;
ii) manufacturing several notched axisymmetric test specimens from pipes or strips extruded from said composition;
iii) subjecting said test specimens to a tensile fatigue test comprising several cycles of uniaxial loading and unloading of the test specimen, inducing in the latter triaxial stresses simulating the conditions of stressing of a pipe as used in the applications targeted, and
iv) determining the number of cycles to failure for said polymeric composition.

In order to carry out a hot creep test, a tensile test is carried out according to the standard ISO 527 (test specimens of type 1A at the rate of 50 mm/min) on nonaged test specimens of the polymeric composition cut out from the thickness of a pipe or of a strip extruded from the polymeric composition. These test specimens are conditioned at the test temperature of 130° C., 20 minutes before the test. The yield stress of these test specimens corresponds to the maximum nominal stress withstood by the test specimens during the tensile testing. The higher the stress, the better the creep strength of the polymeric composition.

Example

The following example illustrates the invention without limiting it.

Compositions are prepared from the following compounds:
Kynar® 401: PVDF homopolymer manufactured by Arkema, having a melt flow index of less than or equal to 5 g/10 min according to the standard ISO 1133 (230° C., 12.5 kg),
Fluorinated copolymer A: VDF-HFP copolymer (35% by weight of HFP) having a melt viscosity of greater than or equal to 3200 Pa·s under 100 $s^{-1}$ at 230° C.,
Fluorinated copolymer B: VDF-HFP copolymer (25% by weight of HFP) having a melt viscosity of greater than or equal to 1800 Pa·s under 100 $s^{-1}$ at 230° C.,
Kynarflex® 2750: VDF-HFP copolymer (15% by weight of HFP) having a melt viscosity of 2250 Pa·s under 100 $s^{-1}$ at 230° C., sold by Arkema,
DBS: dibutyl sebacate (plasticizer).

Seven compositions are tested, two according to the invention (formulations 1 and 2) and five as comparison (formulations 3 to 7).

These compositions are obtained by melt blending powders or granules comprising the various polymeric compounds and also the plasticizer, on a co-kneader of PR 46 type of Buss brand with a diameter of 46 millimeters, with a length 15 times its diameter and equipped with a recovery extruder, at a throughput of 10 kg/h. The rotational speed of the screw of the co-kneader is 150 rev/min and that of the recovery extruder is 15 rev/min and the temperature profile is set so as to obtain an internal temperature of approximately 200° C. All the compounds are introduced at the first inlet of the co-kneader.

The granules obtained are subsequently extruded as a strip or as a pipe with a thickness of between 6 and 10 mm using a single-screw extruder equipped with a suitable die. The temperature profile is set so as to obtain an internal temperature of between 210° C. and 250° C.

The performances of these compositions are measured, in particular the fatigue strength (according to the NCF test described above, both on aged and nonaged samples) and the creep strength (according to the test described above). The results are given in table 1 below. "ND" means that the respective measurements were not carried out.

It is found that the compositions according to the invention exhibit exceptionally good results for fatigue strength. The creep strength is also at a good level. Other tests, with a measurement of ductile/brittle transition temperature, have also demonstrated the excellent performance of the composition according to the invention.

The comparison of examples 1 and 2 according to the invention with comparative examples 4 and 5 shows that the choice of the copolymer A makes it possible to obtain better results in the fresh and aged state for similar copolymer contents.

During the aging for 30 days at 150° C., there is no physicochemical change in the PVDF matrix or in the fluorinated copolymer: the effect of the aging has no impact on the molecular weight of the components or on the crystallinity of the matrix, whether the crystalline morphology or content is concerned. The only change in the materials making up examples 1 and 2 and also examples 4 and 5 brought about by the aging is the loss of the plasticizer after maintaining at 150° C. in air for 30 days. Thus, the comparison of the results in the fresh and aged state in examples 1 and 2 according to the invention and comparative examples 4 and 5 makes it possible to observe the beneficial effect of the presence of the plasticizer (fresh state versus aged state) on the fatigue strength properties in the fresh state.

When examples 7 and 4 are compared, it is observed that the plasticizer-free formulation 7 is less resistant than the formulation 4 in the aged state. In both cases (example 4, aged, and example 7, fresh state), the materials do not have (or no longer have) plasticizer. In addition, their formulation is similar in terms of content and nature of the copolymer used. However, the properties in the fresh state of example 7 are markedly inferior to those of example 4 in the aged state: this difference is explained by the fact that, in the case of example 7, the presence of extrusion defects and of microcracks has been observed, which defects and microcracks do not exist in the case of formulation 4 (which comprised plasticizer in the initial state), and the presence of these microcracks strongly affects the fatigue strength of the material. This is because it is known to a person skilled in the art that the fatigue strength of materials, whatever they are, is highly dependent on the more or less significant presence of defects in the material. It should be noted that this type of defect or microcrack is not observable in any of the other formulations comprising plasticizer: thus, this clearly demonstrates another essential beneficial effect of the plasticizer on the fatigue strength, namely the possibility of extruding thick parts (having a thickness of at least 3 mm) of quality and without defects.

The comparison of examples 1 and 2 according to the invention and of comparative example 5 shows the advantage of using a sufficiently high content of copolymer of type A, the content present in the formulation 5 being clearly insufficient.

Finally, the comparison of examples 1 and 2 according to the invention and of comparative examples 3 and 4 with comparative example 6 shows the advantage of using a fluorinated copolymer comprising a content of comonomer which is sufficiently high to produce a significant improvement in the fatigue properties. Thus, although the content of copolymer in the formulation 6 is comparable to that of example 2 according to the invention and although this formulation has plasticizer, it exhibits a low fatigue strength.

TABLE 1

| Formulation | Composition (% by weight) | NCF (test specimen R4 - 1 Hz at −10° C.) Nonaged | NCF (test specimen R4 - 1 Hz at −10° C.) Aged 30 d at 150° C. in air | Creep strength tensile yield stress at 130° C. [MPa] |
|---|---|---|---|---|
| 1 (inv.) | 71% Kynar ®401 + 3% DBS + 26% fluorinated copolymer A | >50 000 | >10 000 | ≥7 |
| 2 (inv.) | 71% Kynar ®401 + 3% DBS + 20% fluorinated copolymer A | >50 000 | >10 000 | ≥7 |
| 3 (comp.) | 68% Kynar ®401 + 3% DBS + 29% fluorinated copolymer B | 22 100 | 3600 | 7.3 |
| 4 (comp.) | 68% Kynar ®401 + 3% DBS + 25% fluorinated copolymer B | <10 000 | ≤2000 | ND |
| 5 (comp.) | 92% Kynar ®401 + 3% DBS + 5% fluorinated copolymer A | 1000 | 200 | ND |
| 6 (comp.) | 77% Kynar ®401 + 3% DBS + 20% Kynarflex ®2750 | 515 | ND | ND |
| 7 (comp.) | 75% Kynar ®401 + 25% fluorinated copolymer B | 300 | ND | 10 |

The invention claimed is:

1. A composition comprising:
  a polyvinylidene fluoride homopolymer;
  a copolymer consisting of vinylidene fluoride and hexafluoropropylene comonomer, the copolymer being present in the composition in a proportion by weight of 10 to 35%; and
  a plasticizer;
  wherein the copolymer is an elastomer, and
  the proportion by weight of comonomers other than vinylidene fluoride in the copolymer being greater than 25%, and the plasticizer being present in a proportion by weight of 1 to 5%.

2. The composition as claimed in claim 1, in which the plasticizer is chosen from the group consisting of dibutyl sebacate, dioctyl phthalate, N-(n-butyl)sulfonamide, polymeric polyesters and the combinations of these.

3. The composition as claimed in claim 1, in which the plasticizer is present in a proportion by weight of 2 to 3.5%.

4. The composition as claimed in claim 1, in which the copolymer is present in a proportion by weight of 20 to 35%.

5. The composition as claimed in claim 1, in which the proportion by weight of hexafluoropropylene monomer in the copolymer is greater than or equal to 26% and less than or equal to 40%.

6. The composition as claimed in claim 1, wherein said composition exhibits a fatigue strength in the non-aged state of greater than or equal to 50 000 cycles on average, and/or a fatigue strength in the state aged for one month at 150° C. in air of greater than or equal to 5000 cycles on average, in which the fatigue strength was evaluated by means of a process comprising the following stages:
   i) providing a polymeric composition;
   ii) manufacturing several notched axisymmetric test specimens from pipes or strips extruded from said composition;
   iii) subjecting said test specimens to a tensile fatigue test comprising several cycles of uniaxial loading and unloading of the test specimen, inducing in the latter triaxial stresses simulating the conditions of stressing of a pipe as used in the applications targeted, and
   iv) determining the number of cycles to failure for said polymeric composition.

7. The composition as claimed in claim 1, wherein said composition consists of the polyvinylidene fluoride homopolymer, the copolymer of vinylidene fluoride and of hexafluoropropylene, and the plasticizer.

8. A process for the manufacture of a composition as claimed in claim 1, comprising the step of admixing
   a polyvinylidene fluoride homopolymer;
   a copolymer consisting of vinylidene fluoride and hexafluoropropylene comonomer, the copolymer being present in the composition in a proportion by weight of 10 to 35%; and
   a plasticizer;
   wherein the copolymer is an elastomer, and
   the proportion by weight of comonomer other than vinylidene fluoride in the copolymer being greater than 25%, and the plasticizer being present in a proportion by weight of 1 to 5%.

9. The process as claimed in claim 8, in which the homopolymer and the copolymer are in the dry form when admixed with the plasticizer, said admixing with the plasticizer being carried out in the molten state.

10. The process as claimed in claim 8, comprising admixing of the homopolymer and the copolymer in the latex form, drying the admixture of homopolymer and copolymer, and combining of the dried blend with the plasticizer.

11. An article, manufactured from the composition as claimed in claim 1.

12. The article of claim 11, wherein said article is a terrestrial transportation pipe for the transportation of synthetic products in the gas state.

13. The article of claim 11, wherein said article is a terrestrial transportation pipe for the transportation of products in the liquid state, selected from the group consisting of water, solvents, and mixtures of these.

14. The article of claim 11, wherein said article is an underground pipe for a service station, or a fuel feed pipe for vehicles.

15. The article of claim 11, wherein said article is an electric cable.

16. The article of claim 11, wherein said comprises a binder for conductive particles for a rechargeable battery.

17. The article of claim 12, wherein said synthetic products in the gas state are selected from the group consisting of hydrogen, oxygen, steam, carbon monoxide, ammonia, hydrogen fluoride, hydrochloric acid, hydrogen sulfide, any gas resulting from the cracking of hydrocarbons, or mixtures of these.

* * * * *